(12) United States Patent
Bera

(10) Patent No.: US 8,195,802 B2
(45) Date of Patent: Jun. 5, 2012

(54) METHOD AND SYSTEM FOR PROCESSING OF ALLOCATION AND DEALLOCATION REQUESTS IN A COMPUTING ENVIRONMENT

(75) Inventor: Rajendra Kumar Bera, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1256 days.

(21) Appl. No.: 11/539,906

(22) Filed: Oct. 10, 2006

(65) Prior Publication Data

US 2007/0083869 A1   Apr. 12, 2007

Related U.S. Application Data

(62) Division of application No. 10/722,133, filed on Nov. 26, 2003, now Pat. No. 7,011,149.

(51) Int. Cl.
G06F 15/173 (2006.01)
G06F 12/00 (2006.01)

(52) U.S. Cl. .......................... 709/226; 710/200; 710/240

(58) Field of Classification Search .................. 709/226, 709/200, 240
See application file for complete search history.

(56) References Cited

U.S. PATENT DOCUMENTS

| | | | |
|---|---|---|---|
| 4,615,001 A * | 9/1986 | Hudgins, Jr. ................. 718/102 |
| 5,220,675 A | 6/1993 | Padawer et al. |
| 5,253,166 A * | 10/1993 | Dettelbach et al. ............... 705/5 |
| 5,263,155 A * | 11/1993 | Wang ................................. 707/8 |
| 5,295,065 A * | 3/1994 | Chapman et al. ............... 700/99 |
| 5,632,032 A | 5/1997 | Ault et al. |
| 5,701,423 A | 12/1997 | Crozier |
| 5,826,081 A | 10/1998 | Zolnowsky |
| 5,970,466 A | 10/1999 | Detjen et al. |
| 6,016,478 A | 1/2000 | Zhang et al. |
| 6,023,679 A * | 2/2000 | Acebo et al. ....................... 705/5 |
| 6,088,777 A | 7/2000 | Sorber |
| 6,449,357 B1 * | 9/2002 | Sashihara ............... 379/265.09 |
| 6,748,385 B1 | 6/2004 | Rodkin et al. |
| 2001/0044770 A1 * | 11/2001 | Keith ............................. 705/37 |
| 2002/0082878 A1 * | 6/2002 | Boies et al. ......................... 705/5 |
| 2004/0215777 A1 * | 10/2004 | Piet et al. ....................... 709/226 |
| 2006/0229920 A1 * | 10/2006 | Favorel et al. ..................... 705/5 |
| 2007/0256078 A1 * | 11/2007 | Falk et al. ..................... 718/104 |

* cited by examiner

Primary Examiner — Michael Y Won
Assistant Examiner — Tom Y Chang
(74) Attorney, Agent, or Firm — Schmeiser, Olsen & Watts; John Pivinchny

(57) ABSTRACT

A method of processing allocation and deallocation requests in a computing environment. The method forms an Allocation Queue of requests for resource allocations, a Deallocation Queue of requests for resource deallocations, a Pending Queue of requests for resource allocation which cannot be met immediately, and a Cancel Queue of requests to cancel an earlier request already waiting in either the Pending Queue or the Allocation Queue. A cycle of servicing the Allocation Queue, the Deallocation Queue, the Pending Queue, and the Cancel Queue in a chronological sequence is carried out. In the cycle: the Deallocation Queue is serviced first, the Cancel Queue is serviced after the Deallocation Queue is serviced until the Cancel Queue is empty, the Pending Queue is serviced after the Cancel Queue is serviced, and the Allocation Queue Queue is serviced after the Pending Queue is serviced.

20 Claims, 4 Drawing Sheets

| TIME | ROOM A | ROOM B |
|---|---|---|
| 0900 – 0930 | | |
| 0930 – 1000 | | |
| 1000 – 1030 | | |
| 1030 – 1100 | | |
| 1100 – 1130 | | |
| 1130 – 1200 | | |
| 1200 – 1230 | | |

| 0900 – 0930 |
|---|
| 0930 – 1000 |
| 1000 – 1030 |
| 1030 – 1100 |
| 1100 – 1130 |

Fig. 1

| TIME | ROOM A | ROOM B |
|---|---|---|
| 0900 – 0930 | | |
| 0930 – 1000 | | |
| 1000 – 1030 | | |
| 1030 – 1100 | | |
| 1100 – 1130 | | |
| 1130 – 1200 | | |
| 1200 – 1230 | | |

Fig. 2

| 1500 | 1501 | 1502 | 1503 | | 1521 | 1522 |
|------|------|------|------|--|------|------|
| 0600 | 0601 | 0602 | 0603 | | 0621 | 0622 |
| 0500 | 0501 | 0502 | 0503 | | 0521 | 0522 |
| 0400 | 0401 | 0402 | 0403 | | 0421 | 0422 |
| 0300 | 0301 | 0302 | 0303 | | 0321 | 0322 |
| 0200 | 0201 | 0202 | 0203 | | 0221 | 0222 |
| 0100 | 0101 | 0102 | 0102 | | 0121 | 0122 |
| GROUND FLOOR ||||||||

| 15A | 15B |
|-----|-----|
| 16A | 16B |
| 17A | 17B |
| 18A | 18B |
| 19A | 19B |

| 15C | 15D | 15E |
|-----|-----|-----|
| 16C | 16D | 16E |
| 17C | 17D | 17E |
| 18C | 18D | 18E |
| 19C | 19D | 19E |

| 15F | 15G |
|-----|-----|
| 16F | 16G |
| 17F | 17G |
| 18F | 18G |
| 19F | 19G |

Fig. 5

METHOD AND SYSTEM FOR PROCESSING OF ALLOCATION AND DEALLOCATION REQUESTS IN A COMPUTING ENVIRONMENT

This application is a divisional of Ser. No. 10/722,133, filed Nov. 26, 2000 now U.S. Pat. No. 7,011,149.

TECHNICAL FIELD OF THE INVENTION

The present invention relates generally to resource allocation and, in particular, to the allocation of resources including the booking of conference and hotel rooms, the allocation of computer memory, the booking of aircraft seats, the booking of periods of time in a schedule, and the like. The present invention relates to both a method and a system for resource allocation. The invention also relates to a computer program product including a computer readable medium having recorded thereon a computer program for resource allocation, and the program itself. A system for processing queues of allocation requests is also disclosed.

BACKGROUND ART

At present many different forms of computer program are available for carrying out booking, reservation and resource allocation functions. Such computer programs have hitherto relied upon numerical computations in order to test whether a particular resource is free and thus able to be allocated. U.S. Pat. Nos. 5,632,032 and 5,826,082 are indicative of resource allocation techniques which rely upon numerical computations.

By way of contrast, symbolic computations, being at a higher level of abstaction than arithmetic or numerical computations, are naturally more general and versatile in that they can deal with a whole class of problems rather than just specific instances of that class. The advantages are similar to the advantages algebra enjoys in mathematics over arithmetic. The cost is the intellectual effort required in devising rich and compact symbolic systems, which will carry needed information in an easily (or readily) useable manner, and a list of meaningful operations on the symbols. The use of symbolic computations allows general purpose resource allocation systems to be coded into software much more easily and compactly than numerical methods. It therefore offers advantages of quicker and compact coding, less debugging, faster implementation, and mathematical verification.

DISCLOSURE OF THE INVENTION

It is the object of the present invention to provide a method, system and computer program product for resource unit allocation in which the allocation is carried out in symbolic form, rather than through the use of numerical computations.

According to a first aspect of the present invention there is disclosed a method of allocating one or more resource units in a sequence of allocatable resource units, said method comprising the steps of:

(1) identifying each said resource unit with a leading and a trailing identity separated by a first divider, whereby for a pair of adjacent resource units in said sequence, the trailing identifier of the earlier of said adjacent resource units is the leading identifier of the later of said adjacent resource units;

(2) arranging said identifiers and dividers into a pool string corresponding to said sequence of resource units; and (3) identifying an allocated resource unit by changing said first divider into a second divider whereby an allocated resource unit is identified by said leading and trailing identifiers separated by said second divider.

According to a second aspect of the present invention there is disclosed allocated resource unit(s) allocated from the sequence of allocated or resource units in accordance with the above described method.

According to a third aspect of the present invention there is disclosed a system for allocating one or more resource units in a sequence of allocatable resource units, said system comprising:

identifying means to identify each said resource unit with a leading and a trailing identifier separated by a first divider, whereby for a pair of adjacent resource units in said sequence the trailing identifier of the earlier of said adjacent resource units is the leading identifier of the later of said adjacent resource units;

arranging means to arrange said identifiers and dividers into a pool string corresponding to said sequence of resource units; and changing means to change one or more of said first dividers into corresponding second dividers to thereby identify each allocated resource unit by said leading and trailing identifiers being separated by said second divider.

According to a fourth aspect of the present invention there is disclosed a computer program product allocating one or more resource units in a sequence of allocatable resource units, and adapted to be stored in a computer storage medium or transmitted electronically via a transmission medium, said computer program product comprising:

identifying means to identify each said resource unit with a leading and a trailing identifier separated by a first divider, whereby for a pair of adjacent resource units in said sequence the trailing identifier of the earlier of said adjacent resource units is the leading identifier of the later of said adjacent resource units;

arranging means to arrange said identifiers and dividers into a pool string corresponding to said sequence of resource units; and changing means to change one or more of said first dividers into corresponding second dividers to thereby identify each allocated resource unit by said leading and trailing identifiers being separated by said second divider.

According to a fifth aspect of the present invention there is disclosed a method of queuing resource allocation and deallocation requests in a computing environment, said method comprising the steps of:

(1) forming an Allocation Queue of requests for resource allocations, (2) forming a Deallocation Queue of requests for resource deallocations, (3) forming a Pending Queue of requests for resource allocation which cannot be met immediately, (4) forming a Cancel Queue of requests to cancel an earlier request already waiting in either the Pending Queue or the Allocation Queue, (5) carrying out a cycle of servicing said Queues in the sequence comprising said Deallocation Queue, said Cancel Queue, said Pending Queue and said Allocation Queue, and (6) repeating the cycle of step (5).

Preferably, successive resource units in the sequence which are being allocated, are identified by the fact that all the identifiers of the successive resource units are separated by the second identifiers. A request for an allocation of one or more resource units is represented as a request string of identifiers, where each leading and trailing identifier is separated by one of the first dividers. The request string is compared with the pool string, and where a match is detected, the corresponding first dividers are replaced with second dividers in order to allocate the resource units. Resource units are de-allocated by replacing second dividers with first dividers. Linked pool strings can be formed, one of these linked strings being pool string and having appropriate identifiers and first dividers, and the other linked string similarly comprising corresponding first dividers interposed between a corresponding number of ersatz identifiers. A request for an allocation of resource units having a pair of request criteria is actioned by truncating the linked pool strings in accordance with one of the request criteria to form a pair of equal length linked sub-pool strings, and by representing the other request criteria as a request string of the ersatz identifiers separated by first dividers. The request string having the ersatz identifiers is compared with the sub-pool string having the ersatz identifiers, and where a match is detected, the corresponding first dividers in both linked substrings are replaced with second dividers in order to allocate the resource units. Each of the leading and trailing identifiers can be different from the other identifiers. Each of the leading and trailing identifiers can, however, be the same as the other identifiers. Resource units to be allocated can be drawn from many diverse areas, as described in the section on Industrial Applicability below.

BRIEF DESCRIPTION OF THE DRAWINGS

Several preferred embodiments of the present invention will now be described with reference to the drawings, in which:

FIG. 1 is a schematic representation of a portion from a page of a physical book used to book a conference room, or a screen display from a computer program used for that purpose;

FIG. 2 is substantially similar to FIG. 1 but illustrates the situation where two rooms A and B are able to be booked;

FIG. 5 represents a portion of the seats of an aircraft available for booking.

DETAILED DESCRIPTION INCLUDING BEST MODE

Figures 3, 4:
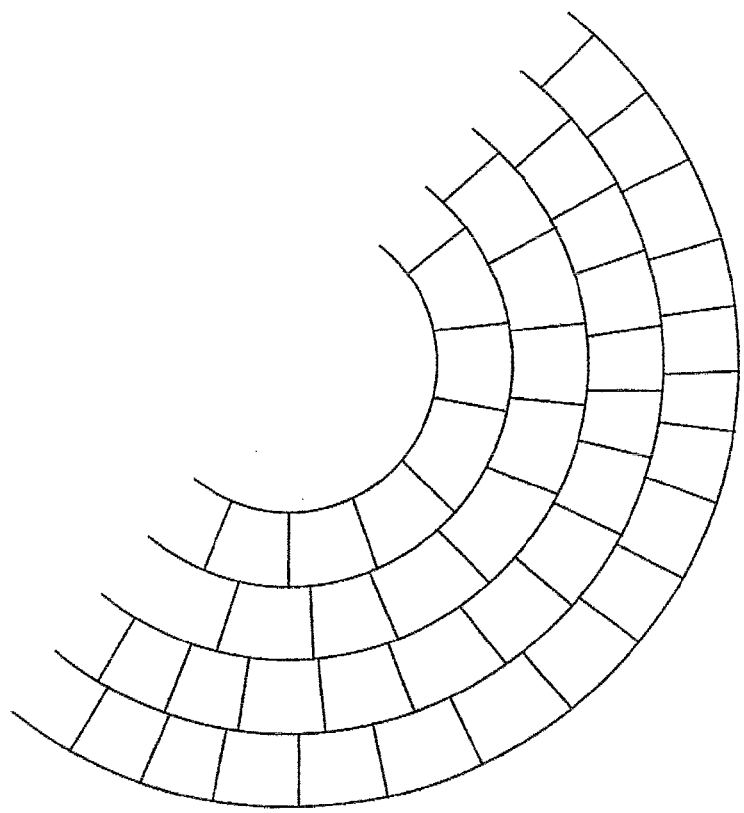
FIG. 3 schematically illustrates the rooms of a hotel able to be booked.
FIG. 4 schematically illustrates the memory locations of a computer disk, the memory locations being allocatable in accordance with an embodiment of the present invention.

In the embodiment illustrated in FIG. 1, the resource to be allocated is a conference room available to be booked and each resource unit takes the form of a period of time which can be of any duration but which in this embodiment is conveniently taken to be 30 minutes. It will be immediately apparent that the embodiment of FIG. 1 is equally applicable to the schedule of an executive, or some other person.

Each unit of time is given a leading and a trailing identifier separated by a first divider. Thus the period of time extending from 0900 to 0930 is represented by 0900/0930 where the leading identifier is 0900, the trailing identifier is 0930 and the first divider is a slash. Since the conference room is able to be booked at any time between the two midnights which commence and end a day, the first available resource unit is designated 0000/0030 and the last available resource unit is designated 2330/2400. All the time periods between these starting and finishing time periods constitute a contiguous sequence of allocatable resource units which constitute a resource pool. Thus for a given day, the resource pool can be represented as a string in the form of a predefined sequence of available units as follows:

Pool String=/0000/0030/0100 . . . /2300/2330/2400/

Note that the string begins and ends with the character "/" which is the same character which acts as the first divider between the various units. This arrangement of the "/'s" allows the identification of the units in the pool string to have a uniform format.

When a request is made for units (ie requesting a booking) the request is encoded into the following substring:

Request String=1030/1100/1130/1200 which represents a request for an allocation of the conference room for the period 1030 to 1200 hours.

Utilising the computer languages C or C++, a substring match is easily able to be carried out using the function "strstr" so as to match the Request String to the Pool String. If a match occurs, then in the matching portion of the Pool String, the first dividers are replaced by second dividers which in this embodiment constitutes the character "&". Thus the amended pool string after the successful match is represented as follows:

Pool String=/0000/0030/0100 . . . /0900/0930/1000/1030 &1100&1130&1200/1230/1300 . . . /2300/2400

As a consequence, any subsequent allocation request that might overlap all or part of the portion provided with the ampersands will not match. No Request String match which includes the first divider can succeed because the second divider is present in critical portion of the Pool String and thus indicates that the corresponding unit has been allocated. That is to say, for a particular unit to be allocatable, its leading and trailing identifiers must be separated by the first divider. Further, a particular allocated unit is characterised by the first and second identifiers being separated by the second identifier.

Once the above allocation procedure is understood, the corresponding deallocation procedure is straightforward. The deallocation request is encoded into the substring:

Deallocation Request String=1030&1100&1130&1200 and the matching process is carried out. When the match is found all the second dividers (&'s) in the Pool String are replaced by first dividers (/'s) indicating that the corresponding units are once again available for allocation.

Turning now to FIG. 2, where two rooms A and B are available to be booked the procedure described above in relation to FIG. 1 is modified so that the Pool String and Request String are as follows:

Pool String=/A0000/A0030/A0100 . . . /A2330/A2400/ B0000/B0030/ . . . /B2400/

Request String=*1030/*1100/*1130 where the symbol * in the Request String represents a "wild" and the request is for any room for the period 1030 to 1130. The extension from two rooms to a larger number of rooms will be apparent to those skilled in the computing arts.

It is also possible to deal with requests where the request includes, say, two criteria which must be simultaneously satisfied. This is done by utilising the concepts of linked pool strings and linked pool substrings. Consider the example used in relation to FIG. 1 where the request is that the booking firstly be at any time between 1000 hours to 1400 hours and that the booking secondly be for a continuous period of two hours within the first specified time period. In order to deal with this situation, two linked strings are created as follows:

Pool String 1=/0000/0030/0100/0130/ . . . /2330/2400/
Pool String 2=/0000/0000/0000/0000/ . . . /0000/0000/

Any allocation, or the allocation, made from the resource pool must be concurrently reflected in both of these strings. Thus in order to carry out the first criterion, the following request string is used:

Request String=1000/1030/1100/1130/1200/1230/1300/1330/1400 which then results in the following two corresponding pool substrings being broken out from the original two strings as follows:

Pool Substring 1=/1000/1030/1100/1130&1200&1230/1300/1330/1400/

Pool Substring 2=/0000/0000/0000/0000&0000&0000/0000/0000/0000/

These sub pool strings reflect the current booking position of the room over the period 1000 to 1400 hours and it will be apparent that there is an existing booking covering the period 1130-1230.

In order then to test whether the second criterion of the request is able to be met, the following request string is created:

Request String=0000/0000/0000/0000/0000 and a match is attempted between this Request String and Pool Substring 2. If the match is successful, then the corresponding substring from Pool Substring 1 is allocated and both Pool Strings are updated by replacing the first divider with the second divider at the appropriate locations. However, in this particular example, since there is not a continuous period of two hours free between 1000 hours and 1400 hours, the attempted match between the last request string and the Pool Substring 2 does not occur and therefore the booking is not able to be made.

Turning now to FIG. 3, the available rooms in a hotel are schematically illustrated. In this embodiment the numbering system for the floors calls the ground or lowermost floor GROUND, the first floor above ground 1, and so on and the top floor 15. On each floor there are 23 rooms available to be let so that the rooms on the first floor are numbered 0100 to 0122 respectively, whilst the rooms on the 15th floor are numbered 1500 to 1522.

Whilst the time periods referred to in relation to FIGS. 1 and 2 conveniently lent themselves to a leading and a trailing identifier, the numbering of the hotel rooms is not so convenient. One possibility is to introduce an extra digit and thus represent, say, room 1502 as 15015/15025 making use of the concept that 2 is midway between 1.5 and 2.5. However, this concept is not very convenient for rooms such as 1500. Therefore it is more convenient to take the leading identifier as being the actual room number and the trailing identifier as being the adjacent room number. Thus Room 1503 is represented as 1503/1504 and Room 1522 is represented as 1522/1523. That is, a phantom trailing identifier is required for the final room of each floor. With this numbering system in mind, the following two Pool Strings are used:

Pool String 1=/0100/0101/0102/ . . . /0122/0123/0200/0201/ . . . /1522/1523/

Pool String 2=/0000/0000/0000/ . . . /0000/0000/0000/0000/ . . . /0000/0000/

The four zeros can be regarded as ersatz identifiers.

Where a single room is to be requested the following Request String is used:

Request String=0000/0000 and where two adjoining rooms are requested, the following Request String is used:

Request String=0000/0000/0000

It will be apparent that the last mentioned Request String can produce a result where, for example, Rooms 1422 and 1500 are regarded as being adjoining. For this reason, prior to making the allocation, it is necessary to test that the first two digits of the adjoining rooms are the same prior to changing the first divider into the second divider. It will be apparent, however, that the above system provides a substantial advantage where block bookings of rooms are requested at a conference, for example. The conference delegates may wish to be located on adjoining rooms and/or adjoining floors so as to minimise elevator movements during peak periods of the conference programme which require delegates to move between their rooms and, for example, a conference location such as a function room or a transport pickup location.

Turning now to FIG. 4, it is possible to use the above system to request an allocation of memory in relation to a computer memory. FIG. 4 schematically illustrates a hard disk drive in which memory blocks are arranged circumferentially around each of a plurality of concentric circular tracks on the disk.

Assume a request for m blocks of memory has come and the memory pool has $n \geq m$ blocks. Since one is generally not concerned about a specific set of m blocks in the memory pool as long as the m blocks are contiguous, we can give the same identification to all the memory blocks. Let this be 1. Then the pool and a Request String are, respectively, encoded as noted below:

Pool String=/1/1/1/ . . . 1/1/ (n blocks represented by (n+1) '1's)

Request String=1/1/1/1 . . . /1/1 (m blocks represented by (m+1) '1's)

The first available m blocks will be allocated from the current Pool String. The allocation handling routine must, of course, maintain the starting address of the allocated blocks for correctly handling a possible deallocation request in the future. Alternatively, linked pool strings are able to be used for the purpose as outlined in the discussion of dual criteria requests above.

FIG. 5 schematically illustrates a plan of a portion of the seats available on an aircraft. It is convenient to adopt a serpentine sequence of arranging the seats so that the seats are ordered 15A, 15B, 15C, 15D, 15E, 15F, 15G, 16G, 16F, . . . 16B, 16A, 17A, 17B, . . . and so on. Furthermore, in order to identify aisle seats (eg 16B, 16C, 16E and 16F), window seats (16A and 16G), and centre seats (eg 16D) the prefixes "a", "w" and "c" are used respectively. Thus the pool string is encoded as follows:

Pool String=/w01A/a01B/ . . . /w15A/a15B/a15C/c15D . . . . . . /a16E/a16F/w16G/w17G/a17F/ . . . /xxxx/

Where xxxx is a phantom trailing identifier required for the last seat on the aircraft.

In order to request an aisle seat the request string becomes:

Request String=a\*\*\*/\*\*\*\* where \* is a wild character. Similarly, the request for a window seat would use the request string:

Request String=w\*\*\*/\*\*\*

A mildly agoraphobic passenger may wish to be seated in a centre seat in which case the request string becomes:

Request String=c\*\*\*/\*\*\*

Naturally if no seating preference is expressed, (or if the aircraft is nearly full and about to depart) then the request string:

Request String=\*\*\*\*/\*\*\*\* should be used.

It will be apparent to those skilled in the computing arts that rather than use a wild character, a symbol (such as +) can be used for a wild string. In that case the four abovementioned request strings respectively become:

Request String=a+/+

Request String=w+/+

Request String=c+/+

Request String=+/+

Some sporting teams etc sometimes request block bookings of seats. That is, it is desired to seat all the team members in either the port block (seats 15A, 15B, 16A, 16B, 17A, 17B, etc) or the centre block (seats 15C, 15D, 15E, 16C, 16D, 16E, etc). The latter particularly applies where the team is travelling at a reduced fare rate and the airline wishes to reserve its window seats for passengers paying the full fare.

In order to deal with this type of booking request, three additional Pool Strings are created as follows:

Pool String Port=/w01A/a01B/a02B/ . . . /w15A/a15B/a16B/ w16A/w17A/a17B/a18B/ . . . .

Pool String Centre=/a01C/c01D/a01E/a02E/ . . . /a16C/ c16D/a16E/a17E/c17D/a17C/a18C/ . . . .

Pool String Starboard=/a01F/w01G/w02G/ . . . /a16F/w16G/ w17G/a17F/a18F/ . . . .

With this preliminary work established, the Request String can be +/+/+/+/+/+/+/+/ for a block of eight seats, for example. This is then checked against one or more of the three Pool Strings until a match is found. Where the seats are to be restricted to a centre block, only a match against the Pool String Centre can be attempted. Alternatively a Request String such as a+/c+/a+/a+/c+/a+/a+/c+/a+ can be used to find a block of nine seats in the centre block.

Since any practical airline reservation system requires both types of booking arrangements, in practice all four types of Pool String (namely Pool String, Pool String Port, Pool String Centre and Pool String Starboard) are required. Further, they must be synchronised at the end of each allocation (or deallocation) operation. Thus, if an allocation (or deallocation) is made using Pool String, then the allocated (or deallocated) units must get reflected in the appropriate Pool String Port, Pool String Centre, or Pool String Starboard. Likewise, if an allocation (or deallocation) is made in one of the pool strings—Pool String Port, Pool String Centre, Pool String Starboard—then the allocated (or deallocated) units must get reflected in Pool String. The synchronisation operation is simple. For each unit that has been allocated (or deallocated) in a pool string, create a request string for each such unit and use it on the other pool string which is to be synchronised with the first.

Since the required string operations can be easily carried out using C or C++ string libraries, the implementation of the allocation/deallocation algorithm is relatively easy. The problem basically reduces to the problem of finding a suitable way of naming the resource units so as to use a nomenclature which is not computationally burdensome.

Queue Processing

An incoming request is placed on one of four queues as described below:

Deallocation Queue—if the request is for deallocation of a previously confirmed allocation.

Pending Queue—if a request cannot be met affirmatively now but the requester is willing to wait.

Cancel Queue—if the request is to cancel a pending request either in the Pending Queue or in the Allocation Queue (described below)

Allocation Queue—if the request is to be examined for possible allocation.

The servicing cycle for the queues is as follows:

1. The Deallocation Queue is serviced first, till empty, to increase resource availability.

2. The Cancel Queue is serviced next, till empty. Here the Allocation Queue and the Pending Queue (in that order) are examined, and the appropriate cancellations effected.

3. The Pending Queue is then serviced. If an allocation can be made it is removed from the Pending Queue, else it retains its relative position in the queue. The processing of this queue requires a little care. The queue is scanned from head to tail once. Before acting upon a request in this queue during the scan, it is first examined for possible allocation conflicts with requests already ahead of it in the queue. If a conflict exists, the request is kept pending.

4. Finally, the request at the head of the Allocation Queue is examined. If it conflicts with a request in the Pending Queue, or if an allocation cannot be made immediately due to unavailability of resource units requested, it is placed at the tail of the Pending Queue if the requester is willing to wait, else the request is rejected. The cycle is then repeated from step 1 onwards.

Detection of Overlapping Requests

A conflict arises when two or more requests overlap each other in part or in whole. This is fairly easy to detect. It is enough to take the first unit and the last unit of a Request String and see if a substring match exists for either of these with any of the requests waiting ahead of it for servicing. If a substring match exists there is an overlap between the requests and the later request cannot be serviced till the earlier one has been serviced or cancelled. This detection method is useful, for example, when checking for possible request conflicts in the Pending Queue.

Legitimacy of a Request

Whether a request is legitimate or not can be easily established by maintaining a copy of the original Pool String. The Request String of any request, if it is legitimate, will be a substring in the original Pool String.

Hardware

Figure 6:
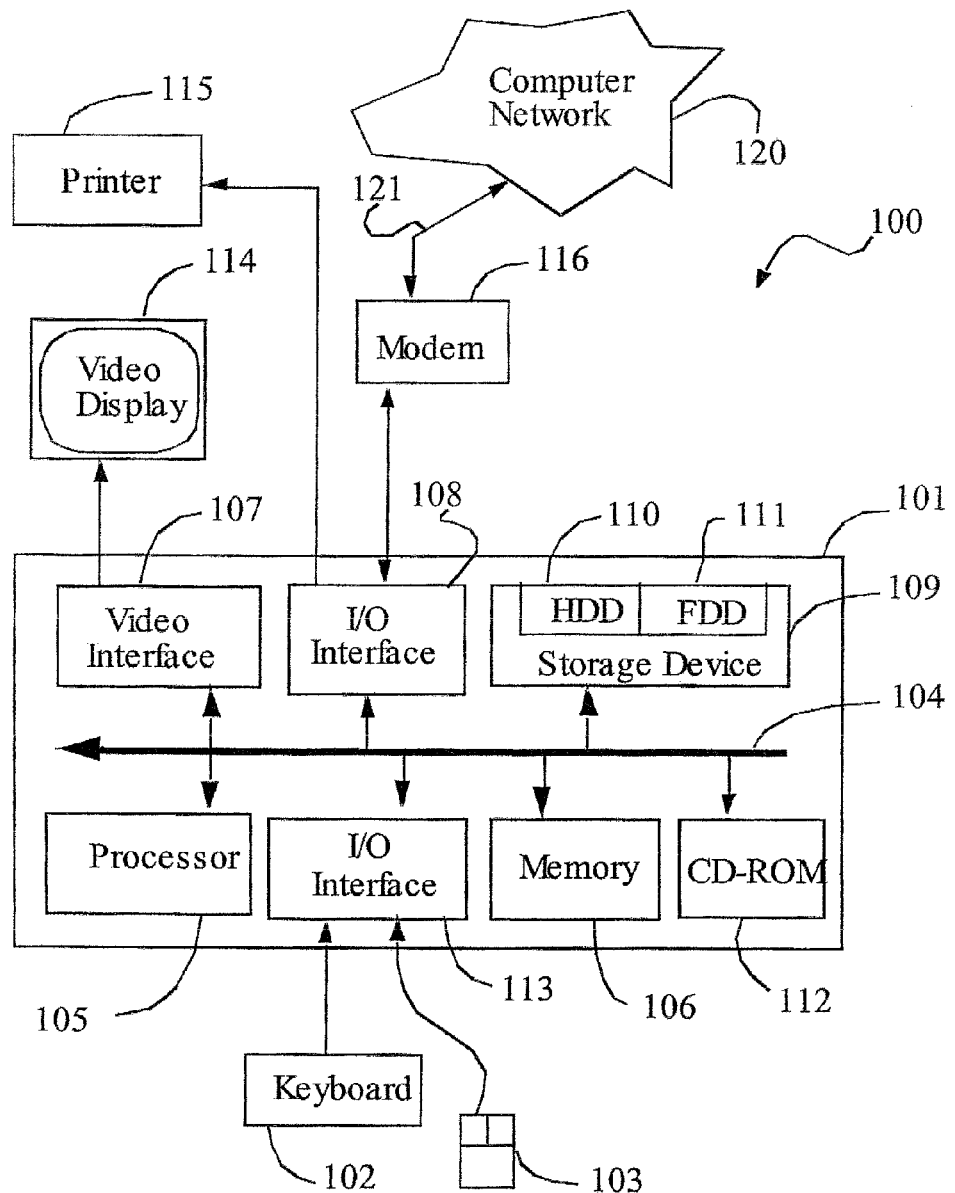
FIG. 6 is a schematic block diagram of a general purpose computer upon which the preferred embodiments of the present invention can be put into practice.

The methods of FIGS. 1-5 are preferably practiced using a conventional general-purpose computer system 100, such as that shown in FIG. 6 wherein the processes of FIGS. 1-5 are able to be implemented as software, such as an application program executing within the computer system 100. In particular, the steps of the methods of FIGS. 1-5 are effected by instructions in the software that are carried out by the computer. The software may be divided into two separate parts; one part for carrying out the methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for carrying out embodiments of the invention.

The computer system 100 comprises a computer module 101, input devices such as a keyboard 102 and mouse 103, output devices including a printer 115 and a display device 114. A Modulator-Demodulator (Modem) transceiver device 116 is used by the computer module 101 for communicating to and from a communications network 120, for example connectable via a telephone line 121 or other functional medium. The modem 116 can be used to obtain access to the Internet, and other network systems, such as a Local Area Network (LAN) or a Wide Area Network (WAN).

The computer module 101 typically includes at least one processor unit 105, a memory unit 106, for example formed from semiconductor random access memory (RAM) and read only memory (ROM), input/output (I/O) interfaces including a video interface 107, and an I/O interface 113 for the keyboard 102 and mouse 103 and optionally a joystick (not illustrated), and an interface 108 for the modem 116. A storage device 109 is provided and typically includes a hard disk drive 110 and a floppy disk drive 111. A magnetic tape drive (not illustrated) may also be used. A CD-ROM drive 112 is typically provided as a non-volatile source of data. The components 105 to 113 of the computer module 101, typically communicate via an interconnected bus 104 and in a manner which results in a conventional mode of operation of the computer system 100 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 110 and read and controlled in its execution by the processor 105. Intermediate storage of the program and any data fetched from the network 120 may be accomplished using the semiconductor memory 106, possibly in concert with the hard disk drive 110. In some instances, the application program may be supplied to the user encoded on a CD-ROM or floppy disk and read via the corresponding drive 112 or 111, or alternatively may be read by the user from the network 120 via the modem device 116. Still further, the software can also be loaded into the computer system 100 from other computer readable medium including magnetic tape, a ROM or integrated circuit, a magneto-optical disk, a radio or infra-red transmission channel between the computer module 101 and another device, a computer readable card such as a PCMCIA card, and the Internet and Intranets including e-mail transmissions and information recorded on websites and the like. The foregoing is merely exemplary of relevant computer readable media. Other computer readable media can be used without departing from the scope and spirit of the invention.

The methods of FIGS. 1-5 may alternatively be implemented in dedicated hardware such as one or more integrated circuits performing the described functions or sub functions. Such dedicated hardware may include graphic processors, digital signal processors, or one or more microprocessors and associated memories.

INDUSTRIAL APPLICABILITY

It is apparent from the above that the embodiment(s) of the invention are applicable to the hotel, airline, and computing and data processing industries. Furthermore, resource units to be allocated can be drawn from many diverse areas. For example, seats in an aircraft, motor vehicles in a dealer showroom, cakes in a bakery window, men's suits in a department store, skating boots for hire, type O blood in a hospital are all resources which can be allocated. Furthermore, lanes in a swimming pool, electromagnetic spectrum, space in a ship cargo hold, memory locations in computer storage, telephone numbers, and communication channels can also be allocated. Yet further, part-time bricklayers, attorneys, airline pilots, and doctors can also be allocated. Yet further, advertising time slots on a TV channel, desk space in an office, and priority bed space in a hospital can be allocated. It is apparent that the seats in an aircraft and shipping containers in a ship's hold are tangible re-usable items which can be allocated. It is further apparent that motor vehicles for sale in a dealer showroom and cakes in a bakery window are tangible consumable items. Furthermore, the amount of space in a ship's hold, and the electro-magnetic spectrum are intangible items. All these items, and many more, can be regarded as resources which can be allocated in accordance with the above embodiments. Furthermore, the aforementioned examples are merely representative of resources which can be allocated in accordance with the above embodiments.

A significant commercial advantage is that a request for a part or a whole of the resource pool can be made without infringing upon the legitimate requests still waiting to be serviced. Furthermore, the request is treated in symbolic form, rather than numerical computations, and therefore has the advantages of ease of coding, compactness of coding, less debugging, faster implementation and mathematical verification.

The foregoing describes only some embodiments of the present invention, and modifications and/or changes can be made thereto without departing from the scope and spirit of the invention, the embodiments being illustrative and not restrictive.

For example, it will be apparent to those skilled in the art that the first divider need not be a slash but can be any character other than those used in the identifiers. A similar comment applies in relation to the second divider.

What is claimed is:

1. A method of processing allocation and deallocation requests in a computing environment, said method comprising:
   forming an Allocation Queue of requests for resource allocations,
   forming a Deallocation Queue of requests for resource deallocations,
   forming a Pending Queue of requests for resource allocation which cannot be met immediately,
   forming a Cancel Queue of requests to cancel an earlier request already waiting in either the Pending Queue or the Allocation Queue,
   a processor of a computer system carrying out a cycle of servicing the Allocation Queue, the Deallocation Queue, the Pending Queue, and the Cancel Queue in a chronological sequence such that in said cycle: the Deallocation Queue is serviced first, the Cancel Queue is serviced after the Deallocation Queue is serviced until the Cancel Queue is empty, the Pending Queue is serviced after the Cancel Queue is serviced, and the Allocation Queue after the Pending Queue is serviced.

2. The method of claim 1, further comprising repeating said carrying out the cycle of servicing the Allocation Queue, the Deallocation Queue, the Pending Queue, and the Cancel Queue.

3. The method of claim 1, wherein said servicing the Cancel Queue comprises examining the Allocation Queue and the Pending Queue and cancelling any allocation requests in the Allocation Queue and the Pending Queue that are identified in the Cancel Queue.

4. The method of claim 1, wherein said servicing the Pending Queue comprises:
   checking each request in the Pending Queue, for one or more conflicts, against both the allocated resources and any earlier request in the Pending Queue; and
   if said checking does not reveal said one or more conflicts, then granting said each request in the Pending Queue by allocating the resources associated with said each request in the Pending Queue.

5. The method of claim 4, wherein said checking comprises checking whether two requests in the Pending Queue either overlap each other in part but not in whole or overlap each other in whole.

6. The method of claim 4, wherein said checking each request in the Pending Queue does not reveal said one or more conflicts.

7. The method of claim 1, wherein said servicing the Allocation Queue comprises:
   checking the earliest request for resource allocations at the head of the Allocation Queue against requests in the Pending Queue; and
   if said checking reveals that said earliest request conflicts with a request in the Pending Queue or the resource allocation associated with said earliest request cannot be immediately implemented, then transferring said earliest request from the Allocation Queue to the tail of the Pending Queue, otherwise implementing the resource allocation associated with said earliest request.

8. The method of claim 7, wherein said checking reveals that said earliest request conflicts with a request in the Pending Queue.

9. The method of claim 7, wherein said checking reveals that the resource allocation associated with said earliest request cannot be immediately implemented.

10. The method of claim 9, wherein said checking reveals that the resource allocation associated with said earliest request cannot be immediately implemented due to unavailability of one or more resources needed to implement said earliest request.

11. The method of claim 7, wherein said checking reveals that said earliest request does not conflict with a request in the Pending Queue and the resource allocation associated with said earliest request can be immediately implemented.

12. The method of claim 11, wherein the resource allocation associated with said earliest request pertains to an allocation of one or more resource units in a sequence of allocatable resource units, and wherein said implementing the resource allocation associated with said earliest request comprises:
   identifying each said resource unit with a leading and a trailing identity separated by a first divider, whereby for a pair of adjacent resource units in said sequence, the trailing identifier of the earlier of said adjacent resource units is the leading identifier of the later of said adjacent resource units;
   arranging said identifiers and dividers into a pool string corresponding to said sequence of resource units; and
   identifying an allocated resource unit by changing said first divider into a second divider whereby an allocated resource unit is identified by said leading and trailing identifiers separated by said second divider.

13. A computer program product, comprising a computer readable medium having a computer readable software program embodied therein, said computer readable software program containing instructions that when executed by a processor of a computer system performs a method of processing allocation and deallocation requests in a computing environment, said method comprising:
   forming an Allocation Queue of requests for resource allocations,
   forming a Deallocation Queue of requests for resource deallocations,
   forming a Pending Queue of requests for resource allocation which cannot be met immediately,
   forming a Cancel Queue of requests to cancel an earlier request already waiting in either the Pending Queue or the Allocation Queue,
   carrying out a cycle of servicing the Allocation Queue, the Deallocation Queue, the Pending Queue, and the Cancel Queue in a chronological sequence such that in said cycle: the Deallocation Queue is serviced first, the Cancel Queue is serviced after the Deallocation Queue is serviced until the Cancel Queue is empty, the Pending Queue is serviced after the Cancel Queue is serviced, and the Allocation Queue after the Pending Queue is serviced.

14. The computer program product of claim 13, wherein said servicing the Cancel Queue comprises examining the Allocation Queue and the Pending Queue and cancelling any allocation requests in the Allocation Queue and the Pending Queue that are identified in the Cancel Queue.

15. The computer program product of claim 13, wherein said servicing the Pending Queue comprises:
   checking each request in the Pending Queue, for one or more conflicts, against both the allocated resources and any earlier request in the Pending Queue; and
   if said checking does not reveal said one or more conflicts, then granting said each request in the Pending Queue by allocating the resources associated with said each request in the Pending Queue.

16. The computer program product of claim 13, wherein said servicing the Allocation Queue comprises:
   checking the earliest request for resource allocations at the head of the Allocation Queue against requests in the Pending Queue; and
   if said checking reveals that said earliest request conflicts with a request in the Pending Queue or the resource allocation associated with said earliest request cannot be immediately implemented, then transferring said earliest request from the Allocation Queue to the tail of the Pending Queue, otherwise implementing the resource allocation associated with said earliest request.

17. A computer system comprising a processor and a computer readable memory unit coupled to the processor, said memory unit containing instructions that when executed by the processor implement a method of processing allocation and deallocation requests in a computing environment, said method comprising:
   forming an Allocation Queue of requests for resource allocations,
   forming a Deallocation Queue of requests for resource deallocations,
   forming a Pending Queue of requests for resource allocation which cannot be met immediately,
   forming a Cancel Queue of requests to cancel an earlier request already waiting in either the Pending Queue or the Allocation Queue,
   carrying out a cycle of servicing the Allocation Queue, the Deallocation Queue, the Pending Queue, and the Cancel Queue in a chronological sequence such that in said cycle: the Deallocation Queue is serviced first, the Cancel Queue is serviced after the Deallocation Queue is serviced until the Cancel Queue is empty, the Pending Queue is serviced after the Cancel queue is serviced, and the Allocation Queue after the Pending Queue is serviced.

18. The computer system of claim 17, wherein said servicing the Cancel Queue comprises examining the Allocation Queue and the Pending Queue and cancelling any allocation requests in the Allocation Queue and the Pending Queue that are identified in the Cancel Queue.

19. The computer system of claim 17, wherein said servicing the Pending Queue comprises:
   checking each request in the Pending Queue, for one or more conflicts, against both the allocated resources and any earlier request in the Pending Queue; and
   if said checking does not reveal said one or more conflicts, then granting said each request in the Pending Queue by allocating the resources associated with said each request in the Pending Queue.

20. The computer system of claim 17, wherein said servicing the Allocation Queue comprises:
   checking the earliest request for resource allocations at the head of the Allocation Queue against requests in the Pending Queue; and
   if said checking reveals that said earliest request conflicts with a request in the Pending Queue or the resource allocation associated with said earliest request cannot be immediately implemented, then transferring said earliest request from the Allocation Queue to the tail of the Pending Queue, otherwise implementing the resource allocation associated with said earliest request.

* * * * *